3,468,918
PROCESS FOR PREPARING Δ¹⁴-3,20-DIKETO-
21-ACYL-STEROIDS
Werner Fritsch, Neuenhain, Taunus, Werner Haede, Hofheim, Taunus, Kurt Radscheit, Kelkheim, Taunus, Ulrich Stache, Hofheim, Taunus, and Heinrich Ruschig, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed Dec. 5, 1966, Ser. No. 598,968
Claims priority, application Germany, Dec. 18, 1965,
F 47,966
Int. Cl. C07c 167/28, 167/14, 169/36
U.S. Cl. 260—397.47                                                    1 Claim

ABSTRACT OF THE DISCLOSURE

Process for preparing Δ¹⁴-3,20-diketo-21-acyloxy-5β-pregnenes or Δ⁴,¹⁴-3,20-diketo-21 acyloxy-pregnadienes, useful as intermediates in the synthesis of cardenolides, by reacting a 3,20-diketo-15α,21-dihydroxy-5β-pregnane or-Δ⁴-pregnene with a sulfonic acid halide to produce a 15,21-disulfonate or 15-sulfonate-21-halide, introducing a 21-acyloxy group thereinto by reaction with an alkali metal carboxylate, and then removing the 15-sulfonate group therefrom by reaction with collidine, lithium salts, or sodium acetate.

---

It is already known that 21-acetoxy-Δ⁴,¹⁴-pregnadiene-3,20-dione can be obtained as follows: 14α-hydroxyprogesterone is heated with acetic acid anhydride in the presence of potassium bisulfate, the Δ⁴,¹⁴-pregnadiene-3,20 dione thus obtained with a yield of about 15% is microbiologically oxidised to 21-hydroxy-Δ⁴-4,14-pregnadiene-3,20 with a yield of 60%, and the latter is subsequently acetylated.

Now we have found that Δ¹⁴-3,20-diketo-21-acyloxy-5β-pregnenes or -Δ⁴-pregnenes can be obtained by reacting 3,20 - diketo-15α-21-dihydroxy-5β-pregnanes or -Δ⁴-pregnenes with sulfonic acid halides, treating these 15,21-disulfonates or 15 - sulfonate - 21 - halides so obtained in the presence of an organic solvent with alkali metal salts of carboxylic acids and partially hydrolysing the 21-acyloxy-15α-sulfonates thus prepared with acid-splitting agents.

As starting compounds in accordance with the present invention, 15α - hydroxy-Δ⁴-pregene-21-ol-3,20-dione as well as 15α-hydroxy-5β-pregnane-21-ol-3,20-dione, these compounds can be obtained, according to U.S. Patent 2,889,255, by biochemical oxidation of the corresponding pregnanes or pregnenes.

The reactions may, for example, proceed according to the following reaction scheme:

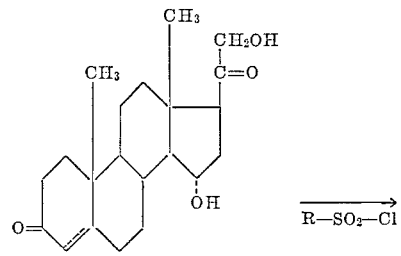

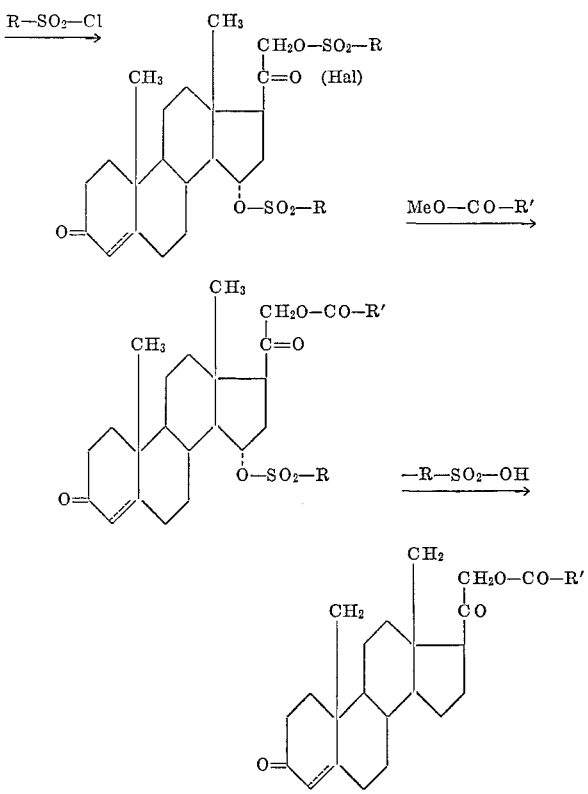

wherein R represents low molecular weight alkyl or aryl, R' represents low molecular weight, alkyl, Me stands for an alkaline agent and Hal represents a halide.

In other positions of the steroid skeleton there may be substituents which are inert against the reactants used, for example alkyl or alkoxy groups or even double linkages, for example in Δ¹, or Δ⁹,¹¹. The 15α-hydroxy-pregnenes or -pregnanes used as starting materials are reacted with sulfochlorides, for example methane-, benzene- or toluene-sulfochloride in the presence of tertiary bases, preferably pyridine, and if required or desired, in the presence of an inert organic solvent, for example acetone. The reaction is carried out at temperatures within the range of from —10° C. to the boiling temperature of the solvent used. It is preferred to operate at temperatures of about 0° C.

During the reaction with sulfonic acid halides in the presence of bases at elevated temperatures, it is possible that an exchange reaction occurs, for example between 21-sulfonate first formed and pyridino-hydrochloride, to form the corresponding 21-chlorine derivatives, which can be reacted in the further reaction process in the same manner as the 21-sulfonates.

The reaction period goes from 5 hours to two days, and depends on the reaction temperature or on the nature of the sulfochlorides used.

The crude 15α,21-disulfonic acid esters or 15α-sulfonic acid ester-21-halides are reacted, advantageously without further purification, with alkali metal salts of carboxylic acids in appropriate solvents, for example acetone, acetone-water-acetic acid mixture, particularly in dimethylformamide. The carboxylic acids may be, for example, low molecular weight carboxylic acids such as, for instance, formic acid, acetic acid, propionic acid or butyric acid, or aromatic carboxylic aids such as, for instance, benzoic acid. It is preferred to use sodium or potassium acetate.

The reaction period goes from 5 minutes to approximately 5 hours. The reaction temperatures range from 50° C. to the boiling temperature of the solvent used. The 15α-sulfone ester group is not affected during the reaction.

The crude 21-acetoxy-15α-sulfonate so obtained is subsequently treated with agents splitting off sulfonic-acid-groups, for example collidine, lithium chloride/dimethylformamide or glacial acetic acid/sodium acetate, at temperature above 80° C. or at the boiling temperature of the solvent used. The reaction period is in general 30 minutes to 10 hours.

In comparison to the process known up to now, the process of the present invention has the advantage that the yield of Δ14-steriods is at least ten times as high as that of the known process. Moreover, the process of the present invention requires only one microbiological stage whereas according to the known process two microbiological stages are necessary.

The products of the present process are valuable intermediary products used for the preparation of cardenolides having a favorable action on the heart.

The following examples serve to illustrate the invention but they are not intended to limit it thereto.

Example 1.—$\Delta^{4,14}$-Pregnadiene-21-ol-3,20-dione-acetate 2.1 g. of finely pulverized $\Delta^4$-pregnene-15α,21-diol-3,20-dione are suspended in a mixture of 24 ml. of acetone and 7.2 ml. of pyridine. After cooling to 0° C. 3.6 ml. of methane-sulfochloride are added and the whole is stirred under nitrogen atmosphere for 5 hours while cooling with ice. To the reaction mixture 150 ml. of water are added and the oily precipitate forming thereupon is extracted with a mixture of methylene chloride/ether. The organic phase is washed until neutral successively with dilute hydrochloric acid, water, sodium bicarbonate solution and water, dried over sodium sulfate and concentrated to dryness in vacuo at a maximum bath temperature of 45° C.

The crude $\Delta^4$-pregnene-15α,21-diol-3,20-dion-15,21-dimesylate so obtained is dissolved without further purification in 20 ml. of dimethylformamide and heated to 60° C. after addition of 2.1 g. of anhydrous potassium acetate and while stirring for one hour. The reaction mixture is then cooled, stirred into 140 ml. of water and extracted with a mixture of methylene chloride/ether. The organic phase is washed several times with water, dried over sodium sulfate and concentrated to dryness in vacuo.

The crude $\Delta^4$-pregnene-15α,21-diol-3,20-dion-15-mesylate-21-acetate thus obtained is dissolved in 20 ml. of collidine and refluxed for 2 hours. The reaction mixture is then poured into water, extracted with methylene chloride/ether and the organic phase is washed until neutral with dilute hydrochloric acid, water and sodium bicarbonate, dried over sodium sulfate and concentrated in vacuo to dryness. The residue is dissolved in a 10:1 mixture of ether/chloroform and filtered through a column of 10 g. of aluminum oxide (acid, stage II of activity, according to Woelm). The colorless filtrate obtained is concentrated to dryness in vacuo and recrystallised from a small amount of acetone/ether. 1.26 g. of $\Delta^{4,14}$-pregnadiene-21-ol-3,20-dion-acetate is obtained, melting at 142° C. (melting bench according to Kofler). $[\alpha]_D^{20}= +131°$ C.

Example 2

1.05 g. of $\Delta^4$-pregnene-15α,21-diol-3,20-dione are reacted with 1.8 ml. of methane-sulfochloride according to Example 1 in a mixture of 12 ml. of acetone and 3.6 ml. of pyridine.

The crude $\Delta^4$-pregnene-15α,21-diol-3,20-dion-15,21-dimesylate obtained is dissolved in 10 ml. of dimethylformamide and heated for 10 minutes to 60° C. while stirring and adding 1 g. of anhydrous potassium acetate. Then the product is worked up according to Example 1.

The crude $\Delta^4$ - pregnene-15α,21-diol-3,20-dion-15-mesylate-21-acetate thus obtained is dissolved in 8 ml. of dimethylformamide and, after addition of 1 g. of lithium carbonate, refluxed for one hour while stirring under a nitrogen atmosphere. After cooling to approximately 60° C. the organic salts are filtered and the residue is washed with a small amount of methanol. The filtrate is acidified with 2 N-acetic acid, diluted with water and subsequently extracted with methylene chloride/ether. The organic phase is washed with water, dried over sodium sulfate and concentrated to dryness in vacuo. After recrystallisation from a small quantity of acetone/ether, 660 mg. of $\Delta^{4,14}$ - pregnadiene-21-ol-3,20-dione are obtained, melting at 142° C.

Example 3.—$\Delta^{14}$-pregnene-21-ol-3,20-dion-acetate 1.25 g. of 5β-pregnane-15α,21-diol-3,20-dione is dissolved in a mixture of 14 ml. of acetone and 4 ml. of pyridine, cooled to 0° C. and stirred for 5 hours with ice cooling after addition of 2 ml. of methanesulfochloride. The reaction mixture is then mixed with 25 ml. of water and extracted with a mixture of methylene chloride and ether, washed until neutral successively with dilute hydrochloric acid, water, sodium bicarbonate solution and water, dried with sodium sulfate and concentrated to dryness in vacuo.

The 5β - pregnane-15α,21-diol-3,20-dion-15,21-dimesylate is dissolved in 10 ml. of dimethylformamide without further purification. After addition of 1 g. of anhydrous potassium acetate the whole is heated to 60° C. for 15 minutes while stirring. After addition of 50 ml. of water the reaction mixture is extracted with methylene chloride/ether. The organic phase is washed with water and, after drying over sodium sulfate, concentrated to dryness in vacuo.

The crude 5β - pregnane-15α,21-diol-3,20-dion-15-mesylate-21-acetate obtained is refluxed for 2 hours and 15 minutes under nitrogen atmosphere with 20 ml. of collidine without further purification. The reaction mixture is then concentrated in vacuo nearly to dryness. The distillation residue is extracted with methylene chloride/ether and the extraction product is washed successively with hydrochloric acid, water, sodium bicarbonate solution and water, until neutral. After drying over sodium sulfate the solution is concentrated to dryness in vacuo. The residue is dissolved in a mixture of 10 parts by weight of ether and one part by weight of methylene chloride and subjected to column chromatography with 7 g. of aluminum oxide (according to Woelm, acid, stage II of activity. Then the whole is eluted with the same mixture of solvents. After recrystallisation from a small quantity of acetone/ether, 660 mg. of $\Delta^{14}$-pregnene-21-ol-3,20-dion-acetate are obtained, melting at 140° C. (melting bench according to Kofler).

We claim:
1. A process for preparing a $\Delta^{14}$-3,20-diketo-21-acyloxy-5β-pregnene or a $\Delta^{4,14}$-3,20-diketo-21-acyloxy-pregnadiene, wherein said 21 acyloxy group is a lower aliphatic acyloxy or a benzoyloxy group, which comprises reacting a 3,20-diketo-15α,21-dihydroxy-5β-pregnane or -$\Delta^4$-pregnene with a sulfonic acid chloride at a temperature of at least −10° C., treating the 15,21-disulfonate or 15-sulfonate-21-chloride so obtained with an alkali metal salt of a lower aliphatic carboxylic acid or of benzoic acid in acetone, dimethylformamide, or mixtures of acetone, water, and acetic acid as a solvent at a temperature of at least 50° C. to introduce a 21-acyloxy group thereinto, and then removing the 15-sulfonate group from the 21- acyloxy compound by treating with collidine, with lithium chloride or lithium carbonate in dimethylformamide, or with sodium acetate in glacial acetic acid at a temperature of at least 80° C.

References Cited

UNITED STATES PATENTS 3,056,808   10/1962   Ayer _____ 260—397.3

OTHER REFERENCES

Bernstein et al.: Journ. Amer. Chem. Soc., vol 82, July 1960, pp. 3685–3689.

LEWIS GOTTS, Primary Examiner

E. C. LOVE, Assistant Examiner